May 13, 1941. O. F. CULLERTON 2,241,767
FISH LURE
Filed Aug. 3, 1940
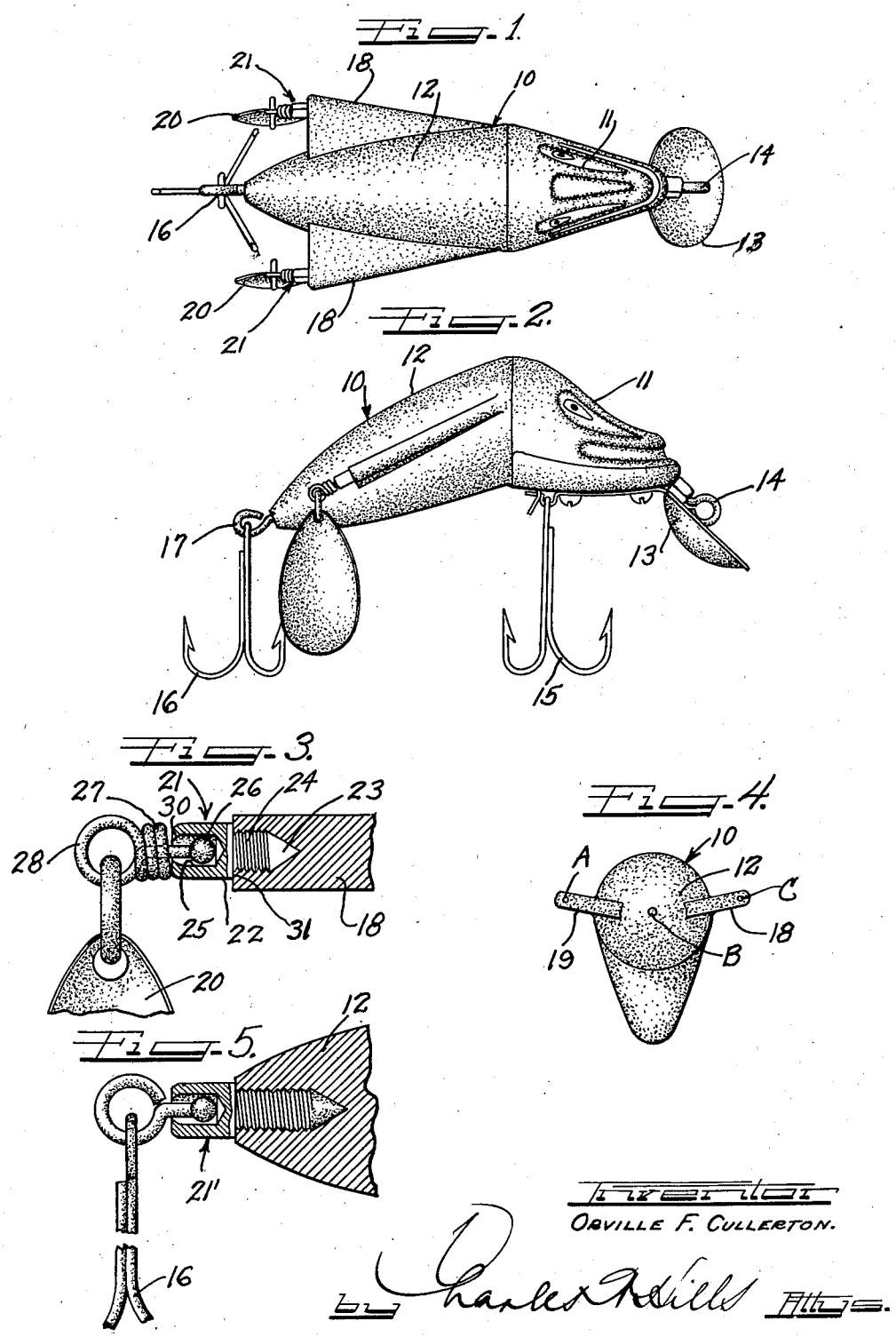
Inventor
ORVILLE F. CULLERTON.
by Charles R. Wills Attys.

Patented May 13, 1941

2,241,767

UNITED STATES PATENT OFFICE 2,241,767

FISH LURE

Orville F. Cullerton, Chicago, Ill., assignor to The W. J. Jamison Company, Chicago, Ill., a copartnership consisting of Ethel B. Cullerton and Orville F. Cullerton Application August 3, 1940, Serial No. 350,792

4 Claims. (Cl. 43—46)

This invention relates to a fish lure and a swivel assembly especially adapted for use with a fish lure.

An object of this invention is to provide a more economical way of attaching an element to be whirled or swiveled to an object such as a fish lure.

Another object of this invention is to provide an improved swivel assembly especially adapted for use in fish lures, and which may be very economically manufactured on a large production basis.

A still further object of this invention is to provide an improved fish lure which will have both a wiggle and spinner action when being propelled through water.

In accordance with the general features of this invention, there is provided a novel swivel assembly especially adapted for use in fish lures which includes a single piece socket member having one end formed with a conical head and threaded so as to be adapted to be screwed into a body such as a plastic body of a fish lure, and having its other end provided with a socket the outer extremity of which is turned inwardly to retain the inserted or ball end of a swivel element in the socket.

Still another feature of the invention relates to the provision of a novel fish lure including head and tail portions of such construction as to have a wiggle-like action in the water, and in which the tail portion has laterally extending opposite fins, the rear extremity of each of which is provided with my novel socket assembly for connecting a spinner element to the rear of the fin.

In accordance with still other features of this invention, there is provided a fish lure having my novel socket assembly used at a plurality of points thereof for securing both spinners and hooks in a swivel manner to the body of the lure, as well as to provide at the head end of the lure a swivel connection for attachment to the fishing line.

Other objects and features of this invention will more fully appear from the following detailed description taken in connection with the accompanying drawing which illustrates several embodiments thereof, and in which:

Figure 1 is a plan view of a fish lure embodying the features of this invention;

Figure 2 is a side view of the lure shown in Figure 1;

Figure 3 is an enlarged fragmentary cross sectional view taken through one of the fins of the lure shown in Figures 1 and 2, and and showing the use of my novel socket assembly for attaching a spinner to the rear extremity of the fin;

Figure 4 is a rear view of the lure shown in Figure 1, with the swivel connections omitted and showing the holes into each of which the socket member of my novel swivel assembly is adapted to be screw threaded; and Figure 5 is an enlarged cross sectional view similar to Figure 3 but showing the tail end of the lure provided with my novel socket assembly for connecting a tandem hook thereto instead of the usual edge shown in Figure 2.

As shown on the drawing:

The reference character 10 designates generally a plastic or wood body of a fish lure, which may be of any suitable construction or fabrication as long as it embodies the features of this invention. As illustrated, the body 10 is in the form of a wiggler including a head portion 11 and a tail portion 12 which are integral. The head portion 11 includes the usual head plate or spoon 13 fastened to the under side of the lure. This spoon is made of metal and is of a construction that is well known to those familiar with this art. Attached to the head portion 11 above the spoon 13 is an eyelet 14 by means of which the lure is attached to a fishing line. This eyelet 14 may, if it is so desired, be connected to the body of the lure by means of my novel swivel assembly which I shall describe hereinafter in conjunction with spinners and hooks. In other words, if it is so desired, the eyelet 14 may be fastened to the head portion 11 so as to have a swivel connection therewith.

Depending from and fastened to the under side of the head portion 11 is a gang hook 15 of conventional construction.

Attached to the rear end of the tail portion 12 is another gang hook 16, which is fastened by means of an eyelet 17 to the rear extremity of the tail portion 12. As I shall describe in conjunction with Figure 5, this gang hook 16 may also be connected to the body of the lure by means of my novel swivel assembly which I shall describe in connection with the spinners.

The tail portion 12 is provided with oppositely disposed lateral fins 18 and 19, each of which is of triangular shape, and has connected to its rear end or, in other words, to the base of the triangle a spinner 20. Each of these spinners is connected to the corresponding fin by means of a swivel assembly designated generally by the reference character 21 and embodying the features of this invention.

These fins 18 and 19 are so arranged as to enable a balanced construction, as well as to provide moorings for the associated spinners. Also, it will be noted from Figure 4 that each of the fins 18 and 19 is slightly inclined relative to the horizontal.

In Figure 3, I have illustrated the details of my novel swivel assembly. This assembly includes the socket member 22 having one end formed with a conical tip 23 and threaded as indicated at 24. This threaded end of the member 22 is adapted to be screwed into an unthreaded smaller hole previously formed in the associated part of the fish lure body. In Figure 4, I have illustrated three such holes A, B, and C, into each of which the threaded end of a socket member is adapted to be screwed. This arrangement is such that the threads 24 on the socket member 22 tap the corresponding hole in the lure body as the socket member is screwed therein.

The other end of the socket member 22 is provided with a socket or bore 25, which may be of cylindrical formation. Disposed in this socket 25 is the ball end 26 of an eyelet element 27 having an eyelet 28 formed on its external or outer end. It is to this eyelet 28 that the spinner 20 is connected as shown in Figure 3.

The ball end 26 of the eyelet element is held in the socket by means of a turned edge 30 formed on the outer end of the socket member 22. This construction is such that the ball end may be first inserted in the socket and thereafter the edge of the socket may be spun or turned to form the turned edge 30.

It will also be noted that the socket member 22 has a shoulder 31 between the socket portion and the threaded portion 24. This shoulder is adapted to abut the surface of the body when the threaded end 24 is screwed into position in the hole in the lure body.

Thus I have provided an economical socket assembly in which the principal socket member is formed of a single piece of metal and may be economically manufactured on a large production basis.

In Figure 5, I have illustrated substantially the same socket assembly 21' for swivelly connecting the gang hook 16 to the rear end of the tail portion 12 of the fish lure. Since this swivel or socket assembly is substantially the same as the assembly 21 previously described, no further detailed description of it is thought necessary.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. As an article of manufacture, a fish lure having a body into which is threaded a swivel socket assembly and a whirling element swivelly connected to the socket assembly, said socket assembly comprising a member having one end threaded and screwed directly into said body and having its other end formed with a socket, and an eye element having one end formed with an eye to which said whirling element is connected and having its other end formed into a ball disposed in said socket, said ball end being retained in said socket by an inwardly turned edge portion at the outer end of said socket member.

2. As an article of manufacture, a fish lure having a body into which is threaded a swivel socket assembly and a whirling element swivelly connected to the socket assembly, said socket assembly comprising a member having one end threaded and screwed directly into said body and having its other end formed with a socket, and an eye element having one end formed with an eye to which said whirling element is connected and having its other end formed into a ball disposed in said socket, said ball end being retained in said socket by an inwardly turned edge portion at the outer end of said socket member, said socket member comprising a single piece of metal of which said socket end comprises a head portion for screwing said threaded end directly into said body.

3. As an article of manufacture, a fish lure having a body provided with head and tail portions, the tail portion being formed with oppositely disposed laterally extending fin portions each of which has swivelly connected to it a spinner element, said fin portions being integral with said tail portion and being disposed in a common plane which passes through said tail portion.

4. As an article of manufacture, a fish lure having a body provided with head and tail portions, the tail portion being formed with oppositely disposed laterally extending fin portions each of which has swivelly connected to it a spinner element, each of said fin portions being of triangular shape with the base of the triangle facing rearwardly and having threadingly disposed therein a unitary socket element to the socket of which the spinner is swivelly connected.

ORVILLE F. CULLERTON.